A1

United States Patent
Corley et al.

(10) Patent No.: US 10,040,914 B2
(45) Date of Patent: *Aug. 7, 2018

(54) COMPOSITES AND EPOXY RESINS BASED ON ARYL SUBSTITUTED COMPOUNDS

(71) Applicant: Hexion Inc., Columbus, OH (US)

(72) Inventors: Larry Steven Corley, Stafford, TX (US); Robert Dale Farris, Stafford, TX (US); Carlton E. Ash, Stafford, TX (US)

(73) Assignee: HEXION INC., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,503

(22) Filed: Oct. 27, 2016

(65) Prior Publication Data

US 2017/0051119 A1   Feb. 23, 2017

Related U.S. Application Data

(62) Division of application No. 14/275,093, filed on May 12, 2014, now Pat. No. 9,499,692.

(60) Provisional application No. 61/822,772, filed on May 13, 2013.

(51) Int. Cl.

| | |
|---|---|
| *B32B 27/00* | (2006.01) |
| *C08J 5/04* | (2006.01) |
| *C08L 63/04* | (2006.01) |
| *C08L 63/00* | (2006.01) |
| *B32B 27/04* | (2006.01) |
| *B32B 27/38* | (2006.01) |
| *C08G 59/06* | (2006.01) |
| *C08G 59/62* | (2006.01) |
| *C08J 5/24* | (2006.01) |
| *C08G 59/24* | (2006.01) |

(52) U.S. Cl.
CPC ............... *C08J 5/042* (2013.01); *B32B 27/04* (2013.01); *B32B 27/38* (2013.01); *C08G 59/063* (2013.01); *C08G 59/245* (2013.01); *C08G 59/621* (2013.01); *C08J 5/04* (2013.01); *C08J 5/24* (2013.01); *C08L 63/00* (2013.01); *C08L 63/04* (2013.01); *C08J 2363/00* (2013.01); *C08J 2363/02* (2013.01); *C08J 2363/04* (2013.01)

(58) Field of Classification Search
None
See application file for complete search history.

(56) References Cited

U.S. PATENT DOCUMENTS

| | | |
|---|---|---|
| 2,739,160 A | 3/1956 | Bell et al. |
| 5,606,006 A | 2/1997 | Wang |
| 6,469,109 B2 | 10/2002 | Ueda et al. |
| 6,797,750 B2 | 9/2004 | Taniguchi et al. |
| 8,313,830 B2 | 11/2012 | Bonneau et al. |
| 8,389,631 B2 | 3/2013 | Bongiovanni et al. |
| 2011/0011533 A1 | 1/2011 | Golden et al. |
| 2011/0319564 A1 | 12/2011 | Corley et al. |
| 2012/0238709 A1 | 9/2012 | Metral et al. |

FOREIGN PATENT DOCUMENTS

| | | |
|---|---|---|
| CA | 2152428 A1 | 6/1995 |

OTHER PUBLICATIONS

Mustafa, Ridzuan et al., Synthesis and Characterization of Rigid Aromatic-based Epoxy Resin, Malaysian Polymer Journal, (2009) 68-75 vol. 4 No. 2, Malaysia.

*Primary Examiner* — Ana L Woodward

(57) ABSTRACT

Compositions and methods for forming epoxy resin are provided, and compositions and methods for forming epoxy resin composites are provided. In one embodiment, a composite comprises an epoxy resin composition comprising an epoxy resin component comprising a glycidyl ether of an aryl substituted phenolic compound, a curing agent component, and a substrate. In one embodiment, a composite comprises an epoxy resin composition comprising an epoxy resin component and a curing agent component comprising an aryl substituted phenolic compound, and a substrate.

7 Claims, No Drawings

COMPOSITES AND EPOXY RESINS BASED ON ARYL SUBSTITUTED COMPOUNDS

RELATED APPLICATION DATA

This Application is a divisional application of co-pending U.S. application Ser. No. 14/275,093, filed May 12, 2014, which application claims benefit to U.S. Provisional Application No. 61/822,772, filed May 13, 2013, of which the entire content of the applications are incorporated by reference herein.

FIELD OF THE INVENTION

The present invention relates to epoxy resin compositions, processes for making and curing epoxy resin compositions, and articles made from epoxy resin compositions.

BACKGROUND OF THE INVENTION

Epoxy resin compositions are used in the manufacturing of various articles, including composites. For certain types of composites, especially for aerospace uses, it is desirable to increase the modulus of the resin matrix in order to improve various properties of the composite. Substitution of highly functional glycidylamine resins for conventional bisphenol A-based epoxy resins in a given formulation may increase modulus but generally at the cost of a considerable reduction in fracture toughness. A resin or curing agent which may give increased resin matrix modulus (in comparison with similar systems using standard bisphenol A-based epoxy resins), with less loss of elongation or toughness (as measured by quasistatic fracture toughness, fatigue crack growth resistance, etc.) would be highly desirable for some applications. Also, resin systems of reduced viscosity are desirable for many fabrication techniques such as filament winding, resin transfer molding, infusion or prepregging.

In light of the above, there is a need in the art for epoxy resin compositions and curing agents for composites with desired mechanical properties when compared to the prior art resin compositions.

SUMMARY OF THE INVENTION

In one aspect, the invention is a composition including an epoxy resin composition, which system includes a reaction product of an epoxy resin component and at least a curing agent.

In another aspect, a composition is provided including an epoxy resin composition comprising an epoxy resin component comprising a glycidyl ether of an aryl substituted phenolic compound with the aryl substituent free of an epoxy containing substituent.

In another aspect, a composition is provided including an epoxy resin composition comprising an epoxy resin component comprising a glycidyl ether of an aryl substituted phenolic compound with the aryl substituent free of an epoxy containing substituent, and a curing agent.

In another aspect, a composition is provided including an epoxy resin component and a curing agent component comprising an aryl substituted phenolic compound with the aryl substituent free of active hydrogen groups.

In another aspect, a composite is provided including an epoxy resin composition comprising an epoxy resin component comprising a glycidyl ether of an aryl substituted phenolic compound with the aryl substituent free of an epoxy containing substituent, and a curing agent component, and a substrate.

In another aspect, a composite is provided including an epoxy resin composition comprising an epoxy resin component and a curing agent component comprising an aryl substituted phenolic compound with the aryl substituent free of active hydrogen groups, and a substrate.

DETAILED DESCRIPTION OF THE INVENTION

Embodiments of the invention include epoxy resins and curing agents, with the epoxy resin, the curing agent, or both, including aryl substituted aromatic compounds. It is believed that epoxy compounds formed from aryl substituted aromatic compounds provide improved properties such as higher modulus. The epoxy resins may be used with curing agents for use in manufacturing composites or adhesives. The epoxy resins made from the aryl substituted aromatic compounds above may be used in combination with other epoxy resins.

In one embodiment, the epoxy resins may be prepared by the glycidation of an aryl substituted phenolic compound where the aryl substituents are free of active hydrogen groups. Examples of aryl substituents free of active hydrogen groups include compounds substituted with functional groups of alkyl, aryl, ether, ester, sulfone, thioether, halogen, nitrile, ketone, and combinations thereof. Examples of active hydrogen groups include functional groups of —SH, —OH, —NH, —COOH, and combinations thereof, among others. It is believed that the epoxy resins which may be prepared by the glycidation of aryl substituted phenolic compounds provide improved properties such as higher modulus.

Suitable aryl substituted phenolic compounds where the aryl substituents are free of active hydrogen groups include aryl substituted bisphenols with the aryl substituent free of active hydrogen groups, arylhydroquinones with the aryl group free of active hydrogen groups, arylresorcinols with the aryl group free of active hydrogen groups, novolacs having phenolic rings substituted with aryl groups free of active hydrogen groups, and combinations thereof. Novolacs are polymers obtained by the reaction of phenol or substituted phenol with formaldehyde, often described as phenol-formaldehyde resins.

The suitable aryl substituted phenolic compounds where the aryl substituents are free of active hydrogen groups may have the formulae:

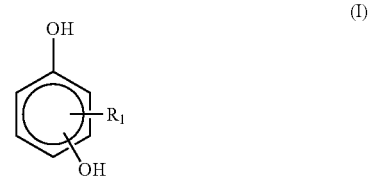

(I)

with

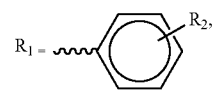

and $R_2$ is hydrogen (H) or a substituent free of an active hydrogen. An example of a formula (I) compound is phenylhydroquinone.

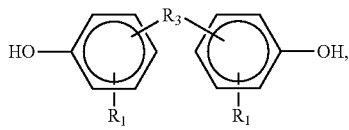
(II)

$R_1$ is the same as formula (I), and $R_3$ is any bridging group. Examples of bridging groups include a methylene group, —$CH_2$—, or an isopropylidene group, —$C(CH_3)_2$—. An example of a formula (II) compound is diphenylbisphenol A.

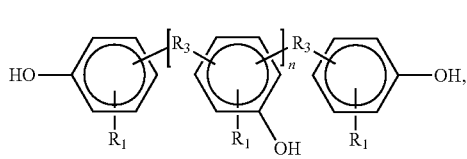
(III)

$R_1$ is the same as formula (I), and $R_3$ is any bridging group. Examples of bridging groups include a methylene group, —$CH_2$—, or an isopropylidene group, —$C(CH_3)_2$—. Examples of formula (III) compounds include novolacs of o-phenylphenol or novolacs of p-phenylphenol.

Suitable aryl substituted phenolic compounds may be selected from the group consisting of 2,2'-diphenylbisphenol A, 4-phenylresorcinol, 5-phenylresorcinol, 2-phenylhydroquinone, 2,5-diphenylhydroquinone, novolac resins containing o-phenylphenol units, novolac resins containing p-phenylphenol units, novolac resins containing p-(p-phenylphenyl) phenol units, and combinations thereof.

In one embodiment, the epoxy resin component, a glycidation product, may be prepared by reacting an epihalohydrin, such as epichlorohydrin, with an aryl substituted phenolic compound under basic conditions, such as in an alkaline reaction medium or in the presence of a suitable base.

The glycidation product of an aryl substituted phenolic compound may comprise a polyglycidyl ether of an aryl-substituted bisphenol with the aryl substituent free of an epoxy containing substituent, a polyglycidyl ether of an arylhydroquinone with the aryl group free of an epoxy containing substituent, a polyglycidyl ether of an arylresorcinol with the aryl group free of an epoxy containing substituent, and combinations thereof; may comprise a monomeric diglycidyl ether of an aryl-substituted bisphenol with the aryl substituent free of an epoxy containing substituent, a monomeric diglycidyl ether of an arylhydroquinone with the aryl group free of an epoxy containing substituent, a monomeric diglycidyl ether of an arylresorcinol with the aryl group free of an epoxy containing substituent, and combinations thereof; a monomeric polyglycidyl ether of a novolac in which the phenolic rings are substituted with aryl groups free of active hydrogen groups; or may comprise a combination of one or more of the polyglycidyl ethers and one or more of the monomeric diglycidyl ethers.

The glycidation product of an aryl substituted phenolic compound may comprise a monomeric diglycidyl ether of an arylhydroquinone with the aryl group free of an epoxy containing substituent, a monomeric diglycidyl ether of an arylresorcinol with the aryl group free of an epoxy containing substituent, and combinations thereof.

The glycidation products corresponding to formulas (I), (II), and (III) are shown as corresponding formulas (IA), (IIA), and (IIIA), as follows:

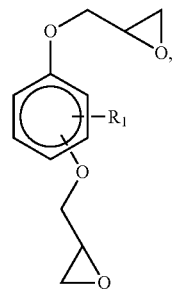
(IA)

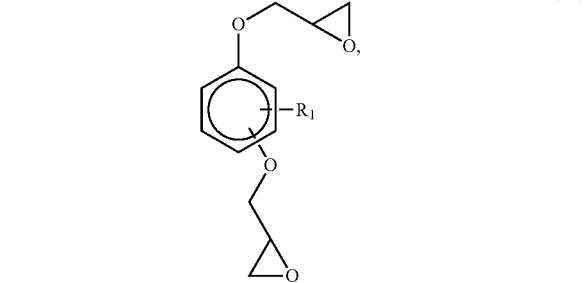
(IIA)

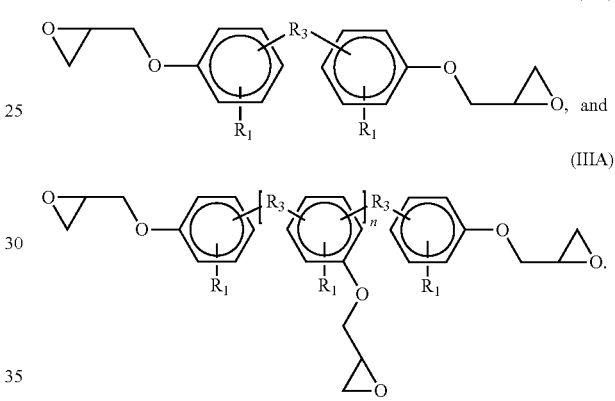
(IIIA)

The epoxy resins made from the aryl substituted phenolic compounds may be used in combination with additional epoxy resins to form the epoxy resin composition. The additional epoxy resins may be used with the epoxy resins prepared by the glycidation of an aryl substituted phenolic compound with the aryl substituents free of an epoxy containing substituent, used with the curing agents prepared from aryl substituted phenolic compounds with the aryl substituents free of active hydrogen groups, or both.

Suitable additional epoxy resins may include epoxy resins made from monomers other than the aryl-substituent phenol monomer with the aryl group free of active hydrogen groups described above. Thus, the additional epoxy resin may comprise an epoxy resin component free of a glycidyl ether of an aryl substituted phenolic compound with the aryl substituent free of an epoxy containing substituent. The additional epoxy resins may be saturated or unsaturated, aliphatic, cycloaliphatic, aromatic or heterocyclic and may be substituted. The additional epoxy resins may also be monomeric or polymeric. The additional epoxy resins of the epoxy resin component may comprise from about 1 percent by weight (wt. %) to about 99 wt. %, such as about 10 wt. % to about 95 wt. % of the epoxy resin component.

The epoxy resins using monomers other than the aryl-substituent phenol monomer with the aryl group free of active hydrogen groups described above may be compounds that may contain at least one vicinal epoxy group. Examples of such epoxy resins include glycidyl amine epoxy resins (or mixtures of glycidyl amine epoxy resins), bisphenol A-based epoxy resins, epoxy novolac resins, cycloaliphatic epoxy resins, and combinations thereof. Further examples of such suitable epoxy resin components include, but are not limited to, polyglycidyl ethers of polyhydric phenols or dihydric phenols, polyglycidyl ethers of glycols or polyglycols, epoxy novolacs, other glycidated polyphenolic resins, polyglycidyl esters of polycarboxylic acids, fusion reaction products between the epoxy resins and additional polyhydric phenolic compounds, such as those disclosed and described in U.S. Pat. Nos. 3,477,990 and 4,734,468, and combinations thereof. The epoxy resin system may further comprise a polyacrylate or polymethacrylate ester of a polyol.

Examples of suitable phenolic compounds used in preparing the epoxy resins using monomers other than the aryl-substituent phenol monomer with the aryl group free of active hydrogen groups described above, include and are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis (4-hydroxy-3-tert-butylphenyl)propane, 1,1-bis(4-hydroxyphenyl)cyclohexane, 2,6,2',6'-tetrachloro-p,p'-bisphenol A, 2,6,2',6'-tetrabromo-p,p'-bisphenol A, 2,6,2',6'-tetramethyl-3,5,3'-tribromo-p-p'-biphenol, 2,6,2',6'-tetramethyl-3,5,3', 5'-tetrabromo-p,p'-biphenol, 2,6,2',6'-tetramethyl-p,p'-biphenol, 1,5-dihydroxynaphthalene, bis(2-hydroxy-1-naphthyl)methane, bis(4-hydroxyphenyl) sulfone, bis(4-hydroxyphenyl) ether and the like and combinations thereof.

Examples of such epoxy resin components include, but are not limited to, EPON™ Resins 825, 826, 828, 862 and 1001 commercially available from Momentive Specialty Chemicals Inc., of Columbus, Ohio.

Suitable glycidyl amine epoxy resins include tetraglycidyl derivatives of aromatic diamines, triglycidyl derivatives of aminophenols, and combinations thereof. Examples of such glycidyl amine epoxy resins include triglycidyl p-aminophenol (TGPAP), tetraglycidyl 4, 4'-methylenedianiline (TGMDA), and combinations thereof.

In another embodiment, the epoxy resin may contain a monofunctional or multifunctional epoxy diluent as a viscosity reducer. Suitable diluents include monofunctional ethers or polyglycidyl ethers of aliphatic or cycloaliphatic glycols or triols or polyols, or polyglycols, and combinations thereof. The monofunctional epoxy diluents may also include monoglycidyl esters. When present, the diluent may comprise from about 1 wt. % to about 50 wt. %, such as from about 10 wt. % to about 30 wt. %, of the epoxy resin component.

Examples of the glycols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane and combinations thereof. Similar to the di-, tri-, and polyhydric phenol based epoxy resins, the aliphatic glycidyl and polyglycidyl ethers are usually prepared by reacting epichlorohydrin with a selected aliphatic diol (or triol or polyol or polyglycol or mixtures) in the presence of a Lewis acid catalyst, followed by conversion of the reaction intermediate(s) with sodium hydroxide to the product(s).

Examples of polyglycidyl ethers of an aliphatic glycol include 1,6 hexanediol diglycidyl ether (HDDGE) and 1,4 butanediol diglycidyl ether (BDDGE). Commercially available examples of such epoxy resin diluent components include, but are not limited to, HELOXY Modifier 32 (a diglycidyl ether of a poly(propylene oxide) glycol), HELOXY Modifier 68 (the diglycidyl ether of neopentyl glycol), HELOXY Modifier 67 (the diglycidyl ether of 1,4-butanediol), HELOXY HD (the diglycidyl ether of 1,6-hexanediol), and HELOXY Modifier 107 (the diglycidyl ether of 1,4-cyclohexanedimethanol) from Momentive Specialty Chemicals Inc.

Monofunctional ethers may include monoglycidyl ethers of phenols or glycidyl ethers based on mono- or multivalent aliphatic or cycloaliphatic alcohols. Examples of such diluents are, for example, phenyl glycidyl ether, cresyl glycidyl ether, p-tert-butylphenyl glycidyl ether, butyl glycidyl ether, $C_{12}$-$C_{14}$ alcohol glycidyl ether, and combinations thereof.

The monofunctional epoxy diluents may also include monoglycidyl esters. Suitable monoglycidyl esters include aliphatic monoglycidyl esters, such as glycidyl esters of monocarboxylic acids, for example a glycidyl ester of hexanoic acid or a glycidyl ester of neodecanoic acid.

The epoxy resin composition of the invention includes the reaction product of at least one epoxy resin component and a curing agent component.

The epoxy resin component may comprise from about 10 percent by weight (wt. %) to about 95 wt. %, such as about 50 wt. % to about 80 wt. %, for example, about 60 wt. % to about 80 wt. % of the epoxy resin composition. The corresponding curing agent component may comprise from about 90 percent by weight (wt. %) to about 5 wt. %, such as about 20 wt. % to about 50 wt. %, for example, about 20 wt. % to about 40 wt. % of the epoxy resin composition. The combined epoxy resin component percent by weight and the curing agent component percent by weight totals 100 percent by weight of the epoxy resin component and the curing agent component.

The epoxy resin component and the curing agent component may be provided at an equivalent ratio of epoxy resin component (epoxy group) to curing agent component from about 10:1 to about 1:2, such as from about 2:1 to about 1:1.5. The initial mixing temperature of the components may be from about 20° C. to about 80° C., such as from about 30° C. to about 70° C. under atmospheric pressure. The curing reaction is performed from about 0.08 hours to about 24 hours, such as from about 1 hour to about 6 hours. The mixing device may include a batch reaction vessel, a semi-batch reaction vessel, a mold, a continuous static mixer, or other suitable device known in the art.

The curing agent may be a compound containing at least one or more aryl-substituted phenol groups with the aryl group free of active hydrogen groups, an amine-containing compound, and combinations thereof.

The curing agent that may be a compound containing at least one or more aryl-substituted phenol groups may be selected from the group of aryl substituted bisphenols with the aryl substituent free of active hydrogen groups, arylhydroquinones with the aryl group free of active hydrogen groups, arylresorcinols with the aryl group free of active hydrogen groups, novolacs having phenolic rings substituted with aryl groups free of active hydrogen groups, and combinations thereof. Examples of suitable compounds include 2,2'-diphenylbisphenol A, 4-phenylresorcinol, 5-phenylresorcinol, 2-phenylhydroquinone, 2,5-diphenylhydroquinone, novolac resins containing o-phenylphenol units, novolac resins containing p-phenylphenol units, novolac resins containing p-(p-phenylphenyl) phenol units, and combinations thereof.

The amine-containing curing agents may be selected from the group of primary amines, secondary amines, tertiary amines, and combinations thereof. The amine-containing curing agents may include a compound having one or more amine groups, such as one or more groups selected from the group of primary amines, secondary amines, tertiary amines, and combinations thereof. The primary amine may have one or more primary amine groups. For example, the primary amine may be a diamine with two primary amine groups. The secondary amine may have at least one secondary amine group and one or more primary amine groups or additional secondary amine groups.

The amine compound may include an amine compound selected from the group consisting of a polyether amine compound, a monoprimary amine, a linear diamine compound, a cyclic diamine compound, a triamine, a polyamine, and combinations thereof.

A suitable polyether amine may have the formula: $H_2NCH(CH_3)CH_2[OCH_2CH(CH_3)]_xNH_2$, where X is the number of repeating ether groups of the polyether amine backbone and X may be from 1 to 70 in number, for example, 2.5, 6.1, 33, or 68. Non-integer numbers of X represent the average value over a molecular weight distribution of a compound. Examples of commercial polyether amines are Jeffamine™ polyetheramines, such as Jeffamine™ D-230 available from Huntsman, Inc., of The Woodlands, Tex. Alternatively, the polyether amine described above may have one or more of the amine groups substituted with a hydrogen atom or an organic functional group, such as an ethyl group.

The monoprimary amine may have two carbons or more, and may be a cyclic monoprimary amine. Suitable monoprimary amines for use in the compositions described herein may include, and are not limited to, N-(3-aminopropyl) morpholine, benzylamine, α-methylbenzylamine, phenethylamine, cyclohexylamine, benzhydrylamine, and combinations thereof.

A diamine may include a linear diamine compound or a cyclic diamine compound, such as isophoronediamine. Examples of diamines that may be used include isophoronediamine (IPDA), 1,3-bis(aminomethyl)benzene, 1,2-diaminocyclohexane, hexamethylenediamine, and combinations thereof.

The polyamine may be an aliphatic primary or secondary polyamine. Examples of such aliphatic primary or secondary polyamines include 1,6-hexanediamine, 1,2-ethanediamine, 2-methyl-1,5-pentanediamine, aminoethylethanolamine, diethylene triamine, triethylene tetramine, tetraethylenepentamine, and combinations thereof, among others.

Suitable tertiary amines for use in the curing agent may include one or more tertiary amines having the formula:

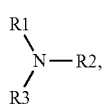

(I)

R1 and R2 groups may each be, independently, an organic functional group having from 1-6 carbon atoms, such as an aliphatic organic group, an alicyclic organic group, or combinations thereof. Examples of aliphatic groups include alkyl groups selected from the group of a methyl group, an ethyl group, and a propyl group. The alicyclic organic group may include, for example, a C5-C6 carbocyclic aliphatic ring, a C5-C6 heterocyclic aliphatic ring, a C5-C6 saturated aliphatic ring, or a C5-C6 unsaturated aliphatic ring. Alternatively, R1 and R2 may jointly comprise one common ring, and R3 may have one carbon atom, such as a methyl group when R1 and R2 jointly comprise one common ring.

The R3 group may be an alkyl group, having a backbone of 2-18 carbon atoms, such as a 3-12 carbon atoms, for example, an 8-12 carbon atom alkyl group. The R3 alkyl group may include a structure selected from the group consisting of a linear alkyl group, a branched alkyl group, an unsaturated alkyl group, a cyclic group, an alkyl group having an aryl ring, and combinations thereof. Preferably, for a group containing an aryl ring, the aryl ring is not bonded to the tertiary nitrogen atom. Suitable R3 alkyl groups may further include a functional group selected from the group consisting of a hydroxyl group, a ketone group, an ester group, an ether group, an amide group, a thioether group, a sulfoxide group, sulfone linkages, and combinations thereof. The R3 alkyl group may further include a functional group selected from the group consisting of a primary amine group, a secondary amine group, a tertiary amine group, and combinations thereof.

Additionally, the R3 alkyl group may include a functional group selected from the group consisting of an acrylate group, a methacrylate group, an acrylamide group, a methacrylamide group, and combinations thereof. For example, $R_1$ and $R_2$ may be both methyl and $R_3$ may contain an acrylate, methacrylate, acrylamide or methacrylamide group. Alternatively, for a R3 alkyl group further consisting of a methacrylamide group, the methacrylamide group may comprise from 7-18 non-hydrogen atoms, and including any additional hydrogen atoms as required to form the group, such as a methacrylamidopropyl group. An example of such a compound is dimethylaminopropylmethacrylamide (DMAPMA).

Alternatively, the R3 group may comprise an aralkyl. The aralkyl group may have one or more carbon atoms disposed between the aryl ring structure and the nitrogen group. One example of the R3 group is a benzyl group, and one example of such a compound is benzyldimethylamine (BDMA).

Suitable tertiary amines may further contain between about 10 to about 50 non-hydrogen atoms, such as carbon atoms, nitrogen atoms, oxygen atoms, sulfur atoms, and combinations thereof.

Examples of suitable tertiary amines include, and are not limited to, dimethylaminopropylmethacrylamide (DMAPMA), octyldimethylamine (ODMA), dodecyldimethylamine (DDMA or ADMA-12), decyldimethylamine (DMA or ADMA-10), dimethylaminoethoxyethanol (DMAEE), and combinations thereof.

An additional curing agent is dicyandiamide.

The amine curing agent, when utilized, may be present in an amount to provide a stoichiometric ratio of the —NH bonds of the second amine compound to the epoxy groups of the epoxy resin component of at least 1:100 or greater, such as 1:20 or greater, including from about 1:20 to about 21:20, such as from about 1:10 to about 19:20, including from about 3:10 to about 3:4, for example, from about 2:5 to 1:2.

The amine curing agent may further comprise an aromatic amine. Examples of suitable such compounds include bis-(4-aminophenyl)sulfone, 1,3-bis(3-aminophenoxy)benzene, 1,3-bis(4-aminophenoxy)benzene, 4,4-methylenedianiline, 1,3-phenylenediamine, diethyltoluenediamine isomers, and combinations thereof.

The composition may alternatively include additional compounds, such as an accelerator, toughening agent, fillers, a viscosity modifying agent, a release agent for molds, and combinations thereof.

In one embodiment of the composition, the composition may include an accelerator known to be compatible with amine-functional groups. Examples include sulfonates such as alkylbenzenesulfonates, phosphonates, sulfates, tetrafluoroborates, carboxylates and nitrates of Groups IA, IIA and transition metals of the Periodic Table (CAS version), preferably Mg, Ca, and Sn (II) salts and complexes. Other examples of accelerators include inorganic acids such as $HBF_4$, $H_2SO_4$, $H_2NSO_3H$, and $H_3PO_4$, carboxylic acids, particularly hydroxyl-group containing carboxylic acids such as salicylic acid, lactic acid, glycolic acid and resorcylic acid; phenolic compounds such as phenol, t-butylphenol, nonylphenol and BPA; imidazoles; cyanamide compounds such as dicyandiamide and cyanamide; sulfonamides such as p-toluenesulfonamide; and imides such as phthalimide, succinimide, maleimide, perylenetetracarboxylic diimide, and saccharin. In one embodiment, accelerators useful for the present invention include, but are not limited to calcium nitrate, calcium alkylbenzene sulfonates, magnesium alkanesulfonates, dicyandiamide, tetrafluoroboric acid, salicylic acid, phenol, dichloroacetic acid, trifluoroacetic acid, thiocyanic acid and mercaptoacetic acid. In another embodiment, the ammonium, calcium or magnesium salt of an acid may be used in place of the acids themselves.

The amount of optional accelerator will vary depending upon the particular curing agent used (due to cure chemistry and curing agent equivalent weight) and may be readily determined by one of ordinary skill in the art. In one embodiment, the accelerator is typically used in an amount of about 5 wt % or less, based upon the total weight of the curing agent.

The toughening agent may be core shell polymers, rubber, or thermoplastic materials, including any combination or subset thereof. Exemplary core shell polymers include, but are not limited to Kaneka Kane Ace® MX products which are core shell rubber dispersions in epoxy, cyanate ester, or other resins. In one embodiment, the core shell polymers include a styrene butadiene rubber, a polybutadiene rubber or a siloxane rubber. In another embodiment, the core of the core shell polymer includes a styrene butadiene rubber, a polybutadiene rubber or a siloxane rubber. Exemplary rubber materials include, but are not limited to carboxyl-terminated butadiene acrylonitrile rubber (CTBN), amine terminated butadiene acrylonitrile rubber (ATBN), butyl acrylate rubber and silicone rubber. Exemplary thermoplastic materials include, but are not limited to Arkema Nanostrength® MMA (methyl methacrylate) and SBM (styrene-butadiene-methacrylate) block copolymers, styrene-butadiene block copolymers, polysulfone, polyethersulfone, polyamide, polyurethane, and poly(butylene terephthalate). For example, a CTBN rubber may be used with an ATBN rubber, in some embodiments. Combinations of different types of toughening agents may also be used. For example, a core shell polymer may be used with a rubber material. Subsets of these combinations may also be used with the invention. Polycarbonate may also be used as a toughening agent.

Fillers may include nanomaterials, nanofibers, and combinations thereof. Exemplary nanomaterials include, but are not limited to nanoclays such as halloysite nanotubes (such as those provided by NaturalNano™) and single- and multi-walled carbon nanotubes (such as those provided by Zyvex® Performance Materials and Nanocyl® S.A.). In one embodiment, the nanomaterial is characterized as a structure having a size of from 1 to 100 nm in at least one dimension. Exemplary nanofibers include those such as the graphite nanofibers provided by Catalyx Nanotech™. In one embodiment, the nanofiber is characterized as a structure having a size of from 1 to 100 nm in at least one dimension. Filler material may also comprise mineral materials including clay, boehmite, calcium carbonates, aluminosilicates, silica, glass spheres, and combinations thereof. The toughening agents may be used in combinations.

It has been observed that the use of the aryl substituted phenolic compound with the aryl substituents free of active hydrogen groups as described herein provide for cured epoxy resins having improved physical properties including increased tensile or flexural modulus and lower viscosity compared to epoxy resins without the use of the aryl substituted phenolic compound with the aryl substituents free of active hydrogen groups described herein.

In one embodiment, a cured epoxy resin of the aryl substituted phenolic compound with the aryl substituents free of an epoxy containing substituent was made. These cured epoxy resins are referred to as "neat castings" in the art. The cured epoxy resin of the aryl substituted phenolic compound with the aryl substituents free of an epoxy containing substituent described herein was observed to have a tensile or flexural modulus of greater than 3 GPa at 25° C. In one embodiment, a cured epoxy resin of the aryl substituted phenolic compound with the aryl substituents free of an epoxy containing substituent described herein had a tensile or flexural modulus at 25° C. of at least 0.5 GPa greater than that of a diglycidyl ether of bisphenol A cured with a stoichiometric amount of the same curing agent.

In one embodiment, an uncured epoxy resin of the aryl substituted phenolic compound with the aryl substituents are free of an epoxy containing substituent described herein had a viscosity at 25° C. of less than 8000 mPa-s, such as from about 3000 mPa-s to about 7000 mPa-s, for example, from about 4000 mPa-s to about 6000 mPa-s.

The epoxy resin compositions described herein may be used for the manufacturing of coating compositions such as ambient temperature cure coating compositions as well as heat cured coating compositions. The epoxy resin compositions may be used and/or formed in one-part or two-part (2K) coating formulations.

The above described epoxy resin compositions may be in the form of a powder, slurry, or a liquid. After a curable epoxy resin composition has been produced, as described above, it may be disposed on, in, or between the described substrates, before or during cure of the curable composition.

Additionally, the epoxy resin compositions described herein may be used for the manufacturing of composites. Composites may be in various forms, such as circuit boards and the like for the electronics industry; parts for the automotive industry and aerospace industry; wind turbine blades; and sports equipment including skis, ski poles, and fishing rods, among others. Although the composite materials may be used for any intended purpose, the composite materials may be used in aerospace applications for both structural and non-structural parts.

Composites may be formed by applying a curable epoxy resin composition to a substrate, such as a reinforcing material, or coating the substrate, and then curing the curable composition. The curable epoxy composition may be applied to the substrate by such techniques including impregnating, infusing, molding, and combinations thereof. Curing of the curable compositions disclosed herein may require a temperature of up to about 250° C., such as at a temperature from about 30° C. to about 120° C. for periods of minutes up to hours, depending on the epoxy resin composition components.

The substrate may be a reinforcing material, such as a fibrous reinforcing material. The fibrous reinforcing material may be selected from hybrid or mixed fiber systems that comprise synthetic or natural fibers, or a combination thereof. The reinforcing material may comprise fibers and or fabrics of organic materials (such as polymeric materials), inorganic materials (such as glass) ceramics, metal-containing fibers, or combinations thereof, and combinations of organic or inorganic materials. Suitable reinforcing materials include, glass fibers, carbon fibers, carbon/graphite fibers, boron fibers, calcium carbonate, talc, aluminum oxide, asbestos, quartz, aramid (aromatic polyamide) fibers, ceramic fibers (or whiskers), silicon carbide or silicon carbide fibers containing titanium and combinations thereof.

The fibers may have a random orientation, uni-directional fibers, or defined constant angle fibers, such as +/−10° and +/−45° direction fibers. Examples of commercially available fibers may include organic fibers, such as KEVLAR™, aluminum oxide-containing fibers, such as NEXTEL™ fibers from 3M, silicon carbide fibers, such as NICALON™ from Nippon Carbon, and silicon carbide fibers containing titanium, such as TYRANNO™ from Ube. Examples of carbon fibers include Torayca T300 carbon fibers commercially available from Toray Carbon Fibers America, Inc., and Panex 35 carbon fibers commercially available from Zoltek Corporation. Examples of fabrics made from such fibers include Orca Composites 17TC13U24 fabric commercially available from Toray Carbon Fibers America, Inc., and Zoltek UD300 fabric commercially available from Zoltek Corporation. Examples of glass fibers include E-glass (electrical glass), S glass, S-2 GLASS@ material, C glass, or basalt glass; silicon carbide or silicon carbide fibers containing titanium, and combinations thereof. For example, the carbon fibers or glass fibers may be uni-directional fibers or +/−45° direction fibers.

The fibrous reinforcing material may comprise cracked (i.e. stretch-broken) or selectively discontinuous fibers, or continuous fibers. The fibrous reinforcing material may be in a woven, non-crimped, non-woven, unidirectional, or multi-axial textile structure form, such as quasi-isotropic chopped pieces of unidirectional fibers. The woven form may be selected from a plain, satin, or twill weave style. The non-crimped and multi-axial forms may have a number of plies and fiber orientations. Such styles and forms are well known in the composite reinforcing field. The fibrous reinforcing material may be a monolayer or a multi-layer material structure.

The fibrous reinforcing material may be present in the composite in an amount effective to impart increased strength and stiffness to the cured composition, and may be present from about 25 to about 95 weight percent, such as from about 50 to about 70 weight percent, based on the weight of the total composite. Alternatively, the epoxy resin component comprises from about 10 vol. % to 99.5 vol. % of the composite.

In one embodiment, the fibrous reinforcing material may comprise high strength filaments or fibers of carbon (graphite), glass, boron, and the like. Composites may contain up to about 90%, such as from about 45% to about 60%, of these fibers based on the total volume (vol %) of the composite. For example, the fibers of the composite may comprise from about 30 vol % to about 90 vol %, for example, about 70 vol %, continuous uni-directional E-glass fibers or carbon fibers; or comprise from about 30 vol % to about 80 vol %, for example, about 75 vol %, continuous+/−45° direction E-glass fibers or carbon fibers of the composite.

The fabrics may be made of woven or non-woven fibers as described herein. The fabrics may be composed of fibers have multiple directions including 0°/90°, +/−10°, +/−45° direction fibers, random orientations, or other orientations. The fabrics may be of two or more layers of fibers.

In the application of epoxy resins to prepare composite materials, a "prepreg", or partially-cured or uncured reinforced epoxy resin, may be prepared in an intermediate step in the fabrication of a composite part. In one embodiment, a prepreg material may be fabricated by impregnating a substrate, such as a reinforcing material, with the uncured epoxy resin composition and heating at a temperature of about 40° C. to 200° C. for a time sufficient to partially cure the resin. The substrate may be fully or partially impregnated with the epoxy resin composition during formation of the prepreg. The prepreg may then be formed into the desired shape and heated at a temperature of about 40° C. to 200° C. for a time sufficient to fully cure the resin to form the composite. The total cure time may be from about 1 to 16 hours under vacuum or under a presence of 1 atmosphere to 150 psi, to form the composite.

The uncured epoxy resin composition is applied to the substrate in accordance with any of the known prepreg manufacturing techniques. Fiber reinforced composites, for example, may be formed by hot melt prepregging. The prepregging method involves impregnating bands or fabrics of continuous fiber with an epoxy resin composition as described herein in liquid form to yield a prepreg, which is laid up and cured or partially cured to provide a composite.

In one embodiment, the prepreg may be in the form of continuous tapes, towpregs, webs, or chopped lengths (chopping and slitting operations may be carried out at any point after the epoxy resin composition is impregnated into the fibrous reinforcing material). The prepreg may be used as an adhesive or surfacing film and may additionally have embedded carriers in various forms, woven, knitted, and non-woven. A prepreg may be produced by dipping the woven or non-woven fabric into the epoxy resin composition by a hot melt method or a solvent method, and semi-curing it through heating. The prepreg material may be molded using any of the standard techniques used to form composite parts.

Two or more prepregs may be used to form laminate structures. Also, two or more prepregs may be used to form multi-layer composite structures, for example, by plying the layers of prepregs together to later compress and heat form into composite parts. In one embodiment of the invention, the epoxy resin composition and fibrous reinforcing materials may be used to form a fiber reinforced, polymer matrix laminated composite structure (PMC).

In one embodiment, one or more layers of prepreg materials are placed in a suitable mold and cured to form the final composite part. A perforated release film and an open/high porosity fabric ("breather") are placed on top of the prepreg material and a flexible air-tight "bag" is placed over the prepreg-release film-breather materials and sealed to the mold surface. A vacuum tube is connected to the flexible bag so that a vacuum can be applied to the prepreg side of the bag. This mold and bag assembly is placed into an autoclave to apply vacuum, pressure and temperature to form and cure the final composite part. This autoclave type process is a preferred procedure. Compression molding of prepreg materials is also a preferred molding process/procedure.

In one embodiment, a composite may be made by a process of providing a substrate, such as a reinforcing fiber substrate, mixing an epoxy resin composition from a composition comprising an epoxy resin component and a curing agent component as described herein, contacting the substrate with the epoxy resin composition, and curing the epoxy resin composition to form the composite. Contacting the reinforcing fiber substrate with the epoxy resin composition may involve any typical composite fabrication process including hand lamination, an infusion process, filament winding, pultrusion, resin transfer molding, fiber pre-impregnation processes, compression molding, and combinations thereof. Infusion processes may include Resin Transfer Molding (RTM) or Vacuum Assisted Resin Transfer Molding (VARTM) processes.

In one embodiment of the process, a composite forming device, an infusion assembly, may be assembled as follows. A temperature controlled rigid mold was provided having a cavity where a reinforcing fiber substrate may be placed. A resin flow medium was provided along one end of the mold to the reinforcing fiber substrate and a vacuum flow medium was provided along another end of the reinforcing fiber substrate (opposite to the resin end) to provide even vacuum flow from the fiberglass stack to the reinforcing fiber substrate. The rigid mold is designed to provide for sealing the cavity to provide a vacuum tight seal between the mold surface and all the above components. A resin tube with a vacuum tight connection to the resin flow medium and a vacuum tube with a vacuum tight connection to the vacuum flow medium were connected to the mold, and a vacuum pump capable of providing absolute pressures typically less than 35 millibars was coupled to the vacuum tubing.

A carbon fiber reinforced laminate may be formed by the following process using the composite forming device described above.

A reinforcing fiber substrate may be prepared, and may comprise more than one layer of carbon fiber fabric. The carbon fibers were unidirectional carbon fiber fabric using commercially available carbon fibers including Torayca T300 carbon fibers commercially available from Toray Carbon Fibers America, Inc., and Panex 35 carbon fibers commercially available from Zoltek Corporation. Examples of fabrics made from such fibers include Orca Composites 17TC13U24 fabric commercially available from Toray Carbon Fibers America, Inc., and Zoltek UD300 fabric commercially available from Zoltek Corporation. The reinforcing fiber substrate was prepared by determining the number of fabric layers needed to obtain the target fiber volume based on the mold cavity thickness and pre-cut fabric. The pre-cut fabric layers were positioned in the cavity with every fabric layer oriented in the same direction.

The mold cavity was filled with the reinforcing fiber substrate and then the mold was then closed. A vacuum was drawn on the closed mold and heat applied to the mold to obtain the desired temperature for the resin injection step. A mixed resin and curing agent system, as described below, was delivered into the mold and contacted the reinforcing fiber substrate. The mixed resin and curing agent system and reinforcing fiber substrate was cured in the mold using a time and temperature profile which results in full cure or sufficient cure to release the laminate from the mold after the cure cycle.

In order to provide a better understanding of the present invention including representative advantages thereof, the following examples are offered. It is understood that the examples are for illustrative purposes and should not be regarded as limiting the scope of the invention to any specific materials or conditions.

EXAMPLES

Epoxy resin compositions described herein were formed by providing an epoxy resin component to a mixing device, providing a curing agent component to the mixing device, and reacting the epoxy resin component and curing agent. Some embodiments of the mixing process are more detailed in the following examples.

For the following examples, the following data categories are provided. The tan δ peak is the maximum in the ratio of the modulus out of phase with the applied stress (E") to the modulus in phase with the applied sinusoidal stress (E') as determined by dynamic mechanical analysis. The "E' knee" is the point of intersection of the tangent drawn at the point of greatest slope in the transition region with the extrapolated baseline prior to the transition. Both tan δ peak and E' knee are used as dynamic mechanical measures of glass transition temperatures. The values were measured following ASTM D-4065 testing procedure.

The flexural yield strength, elastic modulus, and the strain at break of the cured resins in the Examples were measured following ASTM D-790 testing procedure. The tensile strength, tensile modulus, and the tensile elongation of the cured resins in the Examples were measured following ASTM D-638 testing procedure. The tensile strength was determined as the maximum value in the stress-strain curve. The fracture toughness was determined by a unique specimen geometry using ASTM D5045 testing procedure as a guideline.

Example 1: Cure of EPON™ Resin 825 with 2-Phenylhydroquinone in Comparison with Bisphenol A Mixtures of 1 epoxy equivalent of EPON™ Resin 825 with 0.96 hydroxyl equivalent of a bisphenol curing agent (and potassium 2-ethylhexanoate as catalyst) were degassed in flasks at approximately 120° C. under full mechanical pump vacuum, and then poured into a stainless steel pressure mold 3.18 mm (⅛") thick and cured under 750 kPa at about 95 psig nitrogen pressure. The cure schedule was 1 hour at 150° C., followed by linear ramping to 220° C. over a period of time of about 1.45 hours and then holding for 1 hour at 220° C. Mechanical properties of the cured castings were determined and are shown in Table 1 below.

TABLE 1

| Bisphenol Curing Agent | Dynamic Mechanical Properties Temperature at tan δ peak (° C.) | Flexural Properties per ASTM D-790 at 23° C. | | | Fracture Toughness, Kq |
|---|---|---|---|---|---|
| | | Yield Strength (MPa) | Modulus (GPa) | Strain at break (%) | Apparent Stress Intensity Factor (MPa-m$^{1/2}$) |
| 2-Phenyl hydroquinone | 100 | 112 ± 19 | 3.17 ± 0.04 | ≥5.7 | 1.96 ± 0.06 |

TABLE 1-continued

| Bisphenol Curing Agent | Dynamic Mechanical Properties Temperature at tan δ peak (° C.) | Flexural Properties per ASTM D-790 at 23° C. | | | Fracture Toughness, Kq Apparent Stress Intensity Factor (MPa-m$^{1/2}$) |
|---|---|---|---|---|---|
| | | Yield Strength (MPa) | Modulus (GPa) | Strain at break (%) | |
| BPA | 105 | 96 ± 1 | 2.51 ± 0.01 | ≥6.5 | 3.15 ± 0.32 |
| Hydroquinone | 94 | 93 ± 1 | 2.48 ± 0.03 | ≥6.5 | 4.01 ± 0.95 |

Table 1 illustrates the modulus advantage obtained for epoxy cure of EPON™ Resin 825 with 2-phenylhydroquinone versus bisphenol A (BPA). Table 1 also illustrates the modulus advantage obtained for epoxy cure of EPON™ Resin 825 with 2-phenylhydroquinone versus hydroquinone.

Example 2: Glycidation of 2-Phenylhydroquinone

A 1-liter round bottom 4-neck flask was fitted with a paddle stirrer, a thermocouple, a heating mantle, a vacuum/nitrogen purge connection ("Firestone valve") and an addition funnel. To the flask were charged 46.55 grams (0.5 phenolic equivalents) of 2-phenylhydroquinone, 445 grams (4.8 moles) of epichlorohydrin, 222.6 grams of isopropyl alcohol and 74.2 grams of deionized water. The flask was purged with nitrogen and heated to 50° C. with stirring at 180 rpm to dissolve the 2-phenylhydroquinone. The addition funnel was charged with 79.6 grams (0.4 equivalents NaOH) of a 20% aqueous solution of NaOH, which was then added slowly over 1 hour to the flask with stirring. The mixture in the flask was then stirred at 50° C. for an additional hour. The stirrer was then stopped, heating was stopped, the phases were allowed to separate and the lower aqueous phase (brine) was removed. The flask was then again purged with nitrogen and reheated to 50° C. The addition funnel was then charged with 39.8 grams (0.2 equivalents NaOH) of a 20% aqueous solution of NaOH, which was then added slowly over 1 hour to the flask with stirring. The mixture in the flask was then stirred at 50° C. for an additional hour. The stirrer was then stopped, heating was stopped, the phases were allowed to separate and the lower aqueous phase (brine) was removed. Epichlorohydrin and isopropyl alcohol were removed by vacuum stripping (starting at 200 mmHg and finishing at 20 mmHg) at 50-110° C. with addition of three 60-gram portions of deionized water to facilitate the stripping.

The residue was then dissolved in 172.7 grams of methyl isobutyl ketone (MIBK) and heated to 65° C. To the solution was added 6.8 grams of 20% aqueous NaOH (0.034 equivalents). The mixture was held for 75 minutes at 65° C. with stirring at 180 rpm. The MIBK solution was washed with five 100-mL portions of deionized water (until the aqueous phase was no longer alkaline). MIBK was then removed by vacuum stripping (starting at 50 mmHg and finishing at 15 mmHg) at 50-110° C. with addition of three 60-gram portions of deionized water to facilitate the stripping.

The final product was a dark brown liquid with an epoxy equivalent weight of 155.5, a saponifiable chlorine content of 0.0226%, and 94% main component peak area by liquid chromatography. Viscosity (Brookfield) was 8088 mPa-s (cps) at 20° C., 858 mPa-s at 35° C. and 179 mPa-s at 50° C.

Example 3: Cure of Product of Example 2 in Comparison with EPON™ Resin 828 Using an Aromatic Amine Mixture Curing Agent For the purpose of the experiment, the aromatic amine mixture curing agent comprises from 75-81 wt % of 3,5-diethyl-2,4-toluenediamine, 18-20 wt. % 3,5-diethyl-2,6-toluenediamine, and from 0.5-3 wt. % of dialkylated m-phenylene diamines.

To a 125-mL Erlenmeyer flask with a vacuum sidearm was added 0.1 epoxy equivalent of the 2-phenylhydroquinone diglycidyl ether product from Example 2 (or of EPON™ Resin 828 for a control casting) along with 0.102 N—H equivalent of aromatic amine mixture curing agent. The mixtures were degassed under full mechanical pump vacuum with magnetic stirring on a hot plate until bubbling stopped, and then poured into a stainless steel mold 3.18 mm (1/16") thick which had been preheated to 100° C. Cure schedule was 1 hour at 150° C. followed by 2 hours at 200° C. Mechanical properties of the cured castings were determined and are shown in Table 2 below.

TABLE 2

| | Sample 1 | Sample 2 (control) |
|---|---|---|
| Product of Example 2, g | 15.55 | |
| Glycidated bisphenol A, EPON ™ 828 resin, g (178 grams/epoxy equivalents) | | 18.7 |
| Aromatic amine mixture curing agent, g (45 grams/epoxy equivalents) | 4.55 | 4.55 |
| Dynamic Mechanical Tg, ° C. | 156 (tan δ peak) 132 (E' knee) | 174 (tan δ peak) 155 (E' knee) |
| Room Temperature Dry Tensile (ASTM D-638, Type 4) | | |
| Stress at break, MPa | 77.4 | 77.6 |
| Modulus, GPa | 3.18 | 2.35 |
| % strain at break | 4.0 | 6.5 |

From Table 2 above, the casting from the 2-phenylhydroquinone diglycidyl ether product of Example 2 has a higher modulus in comparison with the EPON™ Resin 828 cured with the same curing agent in the same stoichiometric ratio. Also, although the viscosity of the resin-amine mixtures was not determined directly, the amine mixture with the product of Example 2 would be expected to have a considerably lower viscosity than the corresponding mixture with the EPON™ 828 resin because of the lower viscosity of the resin products of Example 2 itself with respect to EPON™ 828 resin.

Composite examples are shown as follows. The composites for the following examples may be formed by the following process using the equipment described herein.

The viscosity was measured by a cone and plate viscometer at a shear rate of 175/s. The transverse flex modulus of the cured composites in the Examples 1-3 was measured following ASTM D-790 testing procedure. The glass transition temperatures were measured by differential scanning calorimetry (DSC) at a 10° C./min heating rate.

Example 4: Composites Formed from Epoxy Compositions

Epoxy compositions for use in composites were formed using glycidated bisphenol A, EPON™ 825, as a control, and 2-phenylhydroquinone diglycidyl ether. The 2-phenylhydroquinone diglycidyl ether was made by the process disclosed in Example 2.

Epoxy compositions were prepared using the components as shown in Table 3A. The process to form the epoxy compositions was performed as shown in Example 3.

TABLE 3A

| Components | Sample 3 (control) | Sample 4 |
|---|---|---|
| Epoxy Resin | | |
| Glycidated bisphenol A, EPON ™ 825, grams (178 grams/epoxy equivalent) | 75 | N/A |
| 2-phenylhydroquinone diglycidyl ether, grams (156 grams/epoxy equivalent) | N/A | 75 |
| Triglycidyl p-aminophenol (TGPAP), grams (101 grams/epoxy equivalent) | 25 | 25 |
| Total weight | 100 | 100 |
| Curing Agent | | |
| Aromatic amine mixture curing agent grams (45 grams/N—H equivalents) | 30.1 | 32.8 |

The viscosities of the epoxy resin and curing agent compositions of Sample 3 and 4 at 60° C. were measured. It was observed that Sample 4 had a viscosity of 71 mPa·S, which was lower than the measured viscosity of Sample 3 of 85 mPa·S.

It was observed that the epoxy resin composition prepared using 2-phenylhydroquinone diglycidyl ether had a viscosity lower than that of the composition prepared using the glycidated bisphenol A, EPON™ 825. A lower viscosity is desirable for several composite molding processes, such as filament winding, pultrusion, and infusion molding. Examples of infusion molding processes are resin transfer molding (RTM), vacuum assisted resin transfer molding (VARTM), and structural resin injection molding (SRIM) processes.

The composites made from Samples 3 and 4 of Table 3 were prepared as follows. A mold having a mold cavity of the dimensions of 165 mm length by 115 mm width by 3.18 mm height was prepared. A reinforcing fiber substrate made of 7 layers of ORCA 17TC13U24 unidirectional carbon fiber fabric having the dimensions of 152 mm by 102 mm was prepared and placed in the mold cavity. The mold was then closed. A vacuum of less than 35 millibars was drawn on the closed mold and heat applied to the mold to obtain a minimum temperature of 60° C. for the resin injection step. A mixed resin and curing agent system of Sample 3 or 4, as described in Table 3A, was delivered into the mold and contacted the reinforcing fiber substrate. The mixed resin and curing agent system and reinforcing fiber substrate was cured in the mold using a time and temperature profile which results in full cure or sufficient cure to release the laminate from the mold after the cure cycle. In these experiments, the following cure profile was used: hold at 120° C. for 4 hours, ramp to 140° C. at 1.0° C./min, cure at 140° C. for 4 hours, and then cool slowly to ~60° C. The laminate could then be removed. The laminates were subjected to a post cure at 200° C. for 2 hours.

The composites were then tested and the properties are shown in Table 3B below.

TABLE 3B

| Composite Properties | Composite from Sample 3 (control) | Composite from Sample 4 |
|---|---|---|
| Transverse Flex Modulus, GPa | 6.594 | 7.573 |

The composite made using Sample 4 was observed to have a 15% higher transverse modulus than the composite made from the control Sample 3.

In view of the above experiments, the epoxy resins based on aryl substituted compounds described herein demonstrate lower viscosities prior to cure and higher stiffness (modulus) after cure (crosslinking) than industry standard liquid epoxy resins made from the bisphenol of acetone (BPA).

While the present invention has been described and illustrated by reference to particular embodiments, those of ordinary skill in the art will appreciate that the invention lends itself to variations not necessarily illustrated herein.

What is claimed is:

1. A composite, comprising:
   an epoxy resin composition comprising:
      an epoxy resin component; and
      a curing agent component comprising an aryl substituted phenolic compound with the aryl substituent free of active hydrogen groups; and
   a substrate, wherein the aryl substituted phenolic compound is selected from the group consisting of an arylhydroquinone with the aryl group free of active hydrogen groups, an arylresorcinol with the aryl group free of active hydrogen groups, and combinations thereof.

2. The composite of claim 1, wherein the aryl substituted phenolic compound is selected from the group of 4-phenylresorcinol, 5-phenylresorcinol, 2-phenylhydroquinone, 2,5-diphenylhydroquinone, and combinations thereof.

3. The composite of claim 1, wherein the epoxy resin composition comprises:
   from about 10 wt. % to about 95 wt. % of the epoxy resin component; and
   from about 90 wt. % to about 5 wt. % of the curing agent component, wherein the total component wt. % comprises 100 wt. %.

4. The composite of claim 1, wherein the epoxy resin component is free of a glycidyl ether of an aryl substituted phenolic compound with the aryl substituent free of an epoxy containing substituent.

5. The composite of claim 1, wherein the curing agent component further comprises an amine-containing component.

6. The composite of claim 1, wherein the epoxy resin component comprises from about 10 vol. % to 99.5 vol. % of the composite.

7. The composite of claim 1, wherein the substrate comprises a reinforcing fiber substrate.

* * * * *